(12) United States Patent
Brialon et al.

(10) Patent No.: US 7,955,070 B2
(45) Date of Patent: Jun. 7, 2011

(54) DEVICE FOR MOULDING PARTS OF A PLASTIC MATERIAL

(75) Inventors: Paul Brialon, Annonay (FR); Christophe Genissieux, Vienne (FR); Jean-Paul Dhuicque, Le Peage de Roussillon (FR); Gilbert Ponson, Bourg Argental (FR)

(73) Assignee: Inoplast, Annonay (FR)

( * ) Notice: Subject to any disclaimer, the term of this patent is extended or adjusted under 35 U.S.C. 154(b) by 0 days.

(21) Appl. No.: 12/449,764

(22) PCT Filed: Mar. 5, 2008

(86) PCT No.: PCT/FR2008/050376
§ 371 (c)(1),
(2), (4) Date: Nov. 10, 2009

(87) PCT Pub. No.: WO2008/125777
PCT Pub. Date: Oct. 23, 2008

(65) Prior Publication Data
US 2010/0092594 A1    Apr. 15, 2010

(30) Foreign Application Priority Data
Mar. 7, 2007 (FR) .................................... 07 53700

(51) Int. Cl.
*B29C 45/76* (2006.01)
(52) U.S. Cl. ......... 425/557; 425/558; 425/559; 425/560
(58) Field of Classification Search .................. 425/557, 425/558, 559, 560, 561
See application file for complete search history.

(56) References Cited

U.S. PATENT DOCUMENTS

| 3,375,309 | A | | 3/1968 | Stevens |
| 4,043,715 | A | * | 8/1977 | Hendry .......................... 425/557 |
| 5,605,707 | A | * | 2/1997 | Ibar ............................... 425/557 |
| 5,773,042 | A | * | 6/1998 | Amano et al. ................. 425/558 |
| 6,017,210 | A | * | 1/2000 | Takayama et al. ............ 425/557 |
| 6,241,935 | B1 | | 6/2001 | Beane et al. |
| 6,461,140 | B1 | | 10/2002 | Bosg et al. |
| 6,461,142 | B1 | * | 10/2002 | Kadoriku et al. ............. 425/558 |
| 2006/0006563 | A1 | * | 1/2006 | Serniuck et al. ............. 425/558 |
| 2007/0052124 | A1 | * | 3/2007 | Park et al. ..................... 425/559 |

FOREIGN PATENT DOCUMENTS
WO    WO 98/35810 A1    8/1998

OTHER PUBLICATIONS

International Search Report issued in international application No. PCT/FR2008/050376 on Sep. 19, 2008.
Preliminary Search Report issued in French patent application No. 0753700 on Oct. 31, 2007.

* cited by examiner

*Primary Examiner* — Tim Heitbrink
(74) *Attorney, Agent, or Firm* — Oliff & Berridge, PLC

(57) ABSTRACT

A molding device including a mold having a stationary portion arranged on a stationary platen of a press, and a movable portion arranged on a movable platen of the press, at least one injection channel for injecting material into the movable portion of the mold, and a feeder device for feeding the mold with plastics material, the feeder device including a stationary installation including a first metering device for metering a first quantity of material. The feeder device includes at least one second metering device arranged on the movable platen, the second metering device being connected to the first metering device in such a manner as to be fed with plastics material by said first metering device, and being connected to the injection channel for injecting material into the movable portion of the mold in such a manner as to be capable of feeding it with plastics material.

12 Claims, 1 Drawing Sheet

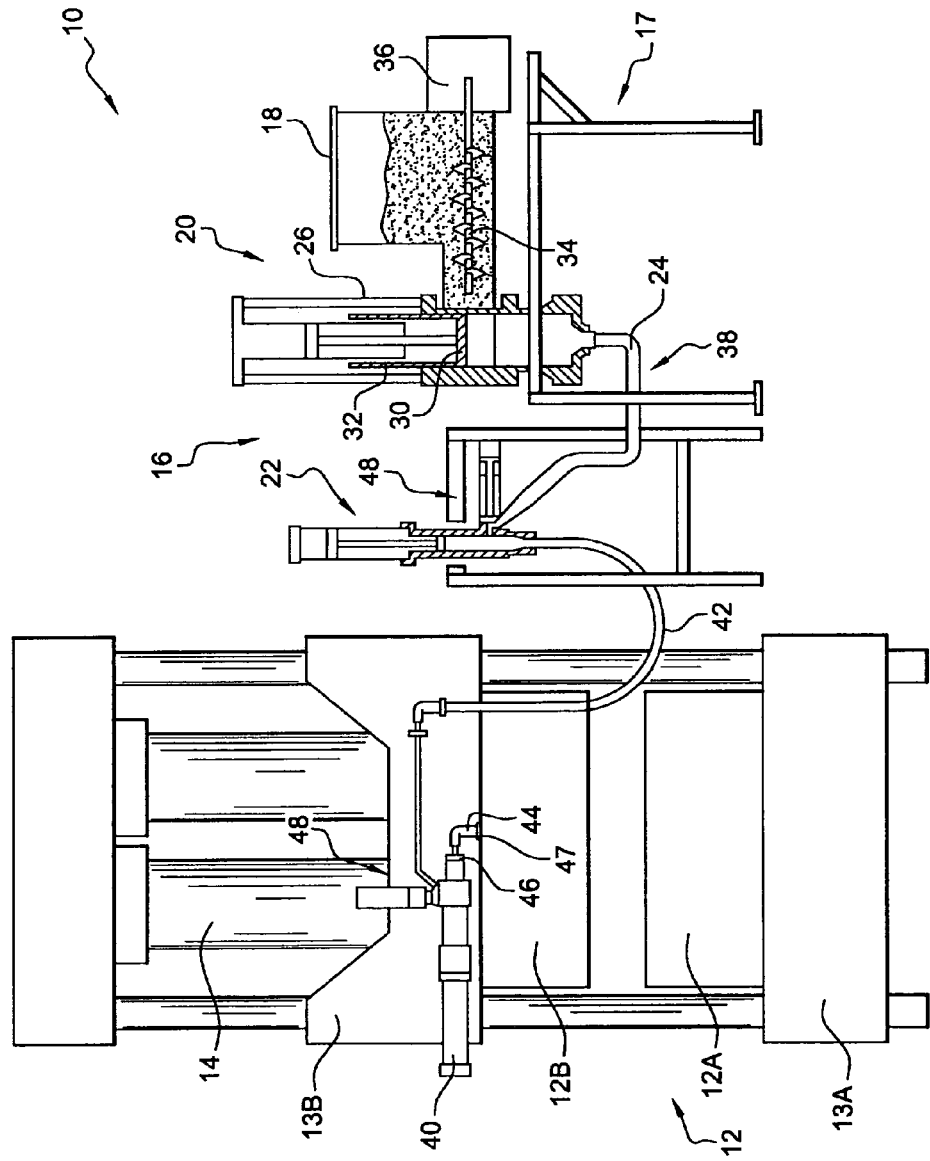

DEVICE FOR MOULDING PARTS OF A PLASTIC MATERIAL

BACKGROUND OF THE INVENTION

1. Field of the Invention

The present invention relates to a device for molding plastics material parts.

2. Description of Related Art

In the state of the art, there is already known a device for molding plastics material parts that is of the type comprising:

- a mold comprising a stationary portion arranged on a stationary platen of a press, and a movable portion arranged on a movable platen of the press;
- at least one injection channel for injecting material into the movable mold portion; and
- a feeder device for feeding the mold with plastics material, the feeder device comprising a stationary installation including a first metering device for metering out a first quantity of material.

In a molding device of that type, the movable portion of the mold is connected to the metering device via at least one flexible hose so as to connect a stationary element, i.e. the metering element arranged on the stationary installation, to a movable element, i.e. the movable portion of the mold.

Nevertheless, such a flexible hose gives rise to significant head losses, in particular because the flexible hose is subjected to variations in volume and to deformation as a function of the position of the movable portion of the mold. Thus, the pressure at which material is transmitted, which pressure is generally 600 bars at the outlet from the metering device, drops in the range 100 bars to 200 bars at the inlet to the mold, because of head losses.

Unfortunately, low pressures at the entrance to the mold generally give rise to a relatively long duration of injection. In addition, for this pressure at the inlet to the mold to remain sufficient to enable injection to be possible, even if over a long duration, it is necessary to supply a large amount of energy to the outlet from the metering device in order to compensate for the head losses.

A particular object of the invention is to remedy those drawbacks by providing a molding device that enables the duration of plastics material injection into the mold to be reduced, while increasing the quality of said injection in spite of head losses in the duct connecting the metering device to the mold.

BRIEF SUMMARY OF THE INVENTION

To this end, the invention provides a molding device for molding plastics material parts, the device being of the type comprising:

- a mold comprising a stationary portion arranged on a stationary platen of a press, and a movable portion arranged on a movable platen of the press;
- at least one injection channel for injecting material into the movable mold portion; and
- a feeder device for feeding the mold with plastics material, the feeder device comprising a stationary installation including a first metering device for metering out a first quantity of material;

the molding device being characterized in that the feeder device includes at least one second metering device arranged on the movable platen, said second metering device being connected to the first metering device in such a manner as to be fed with plastics material by said first metering device, and being connected to the injection channel for injecting material into the movable portion of the mold in such a manner as to be able to feed it with plastics material.

Since the second metering device is arranged on the movable platen of the press, it is stationary relative to the injection channel. Thus, the second metering device and the injection channel can be connected together via at least one duct that is rigid and short, giving rise to little head loss between the second metering device and the injection channel.

The device of the invention is advantageous in that it separates two functions that used to be performed by the single metering device in the prior art.

In the prior art, the metering device was used both to meter a certain quantity of material for injection into the mold and to pressurize that quantity of material so that molding takes place under satisfactory conditions.

By means of the invention, the pressurization is provided by the second metering device, the first metering device serving only to meter a certain quantity of material for delivery to the second metering device.

Thus, at the outlet from the first metering device, it suffices to give to the metered quantity of material sufficient pressure to deliver it to the second metering device, without it being necessary to give it the pressure required for molding to take place properly.

As a result, it is possible to use outlet pressures from the second metering device that are lower than those used at the outlet from the metering device in the prior art, while still achieving satisfactory pressures at the inlet to the mold. These satisfactory pressures serve not only to save energy but also to reduce the duration of injection in satisfactory manner, thereby reducing the duration of a molding cycle.

In addition, since the second metering device enables satisfactory pressure for injection to be imparted, there is no difficulty in using flexible hoses between the first and second metering devices, and in particular flexible hoses in which the maximum admissible pressure is lower than in the hoses of the prior art, thus making it possible to use hoses of lower cost.

It should be observed that the invention also makes it possible to inject larger volumes than in the prior art.

Furthermore, since it is no longer necessary to implement such high pressure at the outlets from the first and second metering devices in order to take account of head losses, it is possible to use low density material that is relatively fragile, such as lightened advanced molding compound (AMC) in which beads of glass are incorporated. The beads of glass are less liable to suffer damage at low pressure than at high pressure.

It should also be observed that since the pressures used are relatively low, the stresses applied to the molding device overall are relatively small, thereby increasing its lifetime.

Finally, it should be observed that since the metering device is arranged close to the movable portion of the mold, in particular when they are connected together by a rigid duct, it is possible to adjust injection parameters in a manner that is simpler and more accurate. It is thus possible to adapt injection parameters to the injected material, e.g. in order to compensate for changes in the physical properties of the material, where said physical properties depend on time. It is known that the material varies over time, and in particular that it becomes more and more viscous, between the beginning and the end of using a given batch of material for molding a series of parts. It is particularly advantageous to be able to compensate for these differences, by adapting the method while using up a given batch.

In general, since the distance between the metering device and the mold is small, given that the second molding device is on the mold, less time is available during which the material might fluctuate, thereby providing finer control over injection.

Optionally, a molding device of the invention may also include one or more of the following characteristics.

The second metering device is arranged on the movable portion of the mold.

The second metering device is connected to the first metering device via at least one flexible connection hose. This flexible connection hose does not impede movement of the movable portion of the mold relative to the stationary installation, since the head loss in this flexible hose has no effect on injection proper.

The injection channel is connected to the second metering device via at least one rigid duct. The use of this rigid duct limits head losses between the second metering device and the mold, and also enables better control to be obtained over the injection of material into the mold since the volume of the rigid duct does not vary, thereby enabling molding to be more reproducible.

The length of the duct connecting the second metering device to the mold is less than 2 meters, so as to further limit head losses.

The stationary installation includes a cramming device connected to the first metering device via at least one rigid connection duct so as to be able to cram the first metering device with plastics material.

The cramming device includes means for delivering plastics material at Low Pressure into the first metering device, and a hopper enabling material to be stored. The term "Low Pressure" is used to designate a pressure less than 10 bars.

The cramming device includes means for delivering plastics material at Medium Pressure into the first metering device. The term "Medium Pressure" is used to designate a pressure lying in the range 10 bars to 60 bars.

The molding device includes heater means arranged to preheat the plastics material flowing between the cramming device and the first metering device.

The stationary installation includes a hopper for storing plastics material for feeding the mold with plastics material.

Each metering device is provided with hydraulic pressure and flow rate regulator means.

The plastics material is a thermosetting material, for example selected from advanced molding compound (AMC), bulk molding compound (BMC), sheet molding compound (SMC), and a composite material.

The invention also provides a feeder device for feeding plastics material to a mold comprising a stationary portion and a movable portion, at least one injection channel for injecting material being provided in the movable portion of the mold, the feeder device comprising a stationary installation including a first metering device for metering a first quantity of material, the feeder device being characterized in that it includes at least one second metering device for arranging in stationary manner relative to the movable portion of the mold, said second metering device being connected to the first metering device in such a manner as to fed with plastics material by said first metering device, and being shaped to be connected to the injection channel of the movable portion of the mold in such a manner as to feed it with plastics material.

The invention can be better understood on reading the following description given purely by way of example and made with reference to the sole FIGURE that shows a molding device constituting an embodiment of the invention.

DETAILED DESCRIPTION OF THE INVENTION

The FIGURE shows a device for molding plastics material parts, the device being given overall reference 10. The plastics material is preferably a thermosetting material, e.g. BMC, AMC, SMC, or a composite material.

The parts are molded with the help of a mold 12 comprising a stationary portion 12A fastened to a stationary platen 13A and a movable portion 12B fastened to a platen 13B that is movable relative to the stationary platen 13A by movement means 14, e.g. hydraulic actuators.

The mold 12 is fed with thermosetting material by a feeder device 16.

The feeder device 16 comprises a stationary installation 17 including a storage hopper 18 storing the thermosetting material that is to be fed to the mold 12.

The hopper 18 is connected to a cramming device 20 connected to a first metering device 22 via a rigid connection duct 24, so as to enable the first metering device 22 to be crammed with thermosetting material. The cramming device 20 and the first metering device 22 are both carried by the stationary installation 17.

By way of example, the cramming device 20 comprises means 26 for delivering material at Low Pressure, and connected to the hopper 18.

The Low Pressure delivery means 26 comprise a piston 30 designed to move in a cylinder 32 so as to expel the thermosetting material into the rigid connection duct 24. Furthermore, the hopper 18 includes an auger 34 driven by a motor 36 to take material from the hopper 18 to the delivery means 26 of the cramming device 20, while increasing the delivery pressure.

In a variant, the cramming device 20 may include Medium Pressure material delivery means connected directly to a tank.

The connection duct 24 is relatively short to limit head losses between the cramming device 20 and the metering device 22, e.g. it is of a length shorter than 2 meters.

The connection duct 24 is preferably provided with heater means 38 for preheating the thermosetting material traveling between the cramming device 20 and the metering device 22. These heater means 38 are preferably arranged on rigid portions of the molding device. For example, the duct 24 comprises inner and outer coaxial pipes and a heat-conveying liquid, such as hot water, that flows between the inner and outer pipes so as to heat the plastics material traveling in the inner pipe by transferring heat thereto.

The metering device 22, when filled with thermosetting material, serves to meter out a first quantity of material for delivery via a flexible connection hose 42 to a second metering device 40 that is arranged on the movable platen 13B, and that is thus stationary relative to the movable mold portion 12. By way of example, the second metering device 40 may be arranged on the movable portion of the mold 12.

The second metering device 40 serves to meter out a second quantity of material that is to be delivered to the mold via one or more injection channels 44 for injecting thermosetting material into the mold. The injection channels 44 are arranged on the movable platen 13B, and thus in a manner that is stationary relative to the movable portion 12B of the mold, and they are connected to the second metering device 40 via a rigid connection duct 46 of length that is preferably shorter than 2 meters so as to limit head losses in the duct 46. Generally, each of the injection channels 44 includes an injector 47 at its injection end, specifically for the purpose of opening and closing the injection channel 44 so as to feed material into the mold, or not as the case might be.

Preferably, the first and second metering devices 22 and 40 are provided with hydraulic pressure and flow rate regulator means 48.

Finally, it should be observed that the invention is not limited to the above-described embodiment, but covers any variant using equivalent means to reproduce its essential characteristics.

For example, the molding device 10 could, in a variant, include a plurality of second metering devices.

The invention claimed is:

1. A molding device for molding plastics material parts, the device comprising:
   a mold comprising a stationary portion arranged on a stationary platen of a press, and a movable portion arranged on a movable platen of the press;
   at least one injection channel for injecting material into the movable mold portion; and
   a feeder device for feeding the mold with plastics material, the feeder device comprising a stationary installation including a first metering device for metering out a first quantity of material;
   wherein the feeder device includes at least one second metering device arranged on the movable platen, said second metering device being connected to the first metering device in such a manner as to be fed with plastics material by said first metering device, and being connected to the injection channel for injecting material into the movable portion of the mold in such a manner as to be able to feed it with plastics material.

2. A molding device according to claim 1, wherein the second metering device is connected to the first metering device via at least one flexible connection hose.

3. A molding device according to claim 1, wherein the injection channel is connected to the second metering device via at least one rigid duct.

4. A molding device according to claim 1, wherein the stationary installation includes a cramming device connected to the first metering device via at least one rigid connection duct so as to be able to cram the first metering device with plastics material.

5. A molding device according to claim 4, wherein the cramming device includes means for delivering plastics material at Medium Pressure into the first metering device.

6. A molding device according to claim 4, wherein the cramming device includes means for delivering plastics material at Low Pressure into the first metering device.

7. A molding device according to claim 4, including heater means arranged to preheat the plastics material flowing between the cramming device and the first metering device.

8. A molding device according to claim 1, wherein the stationary installation includes a hopper for storing plastics material for feeding the mold with plastics material.

9. A molding device according to claim 1, wherein each metering device is provided with hydraulic pressure and flow rate regulator means.

10. A molding device according to claim 1, wherein the plastics material is a thermosetting material.

11. A feeder device for feeding plastics material to a mold comprising a stationary portion and a movable portion, at least one injection channel for injecting material being provided in the movable portion of the mold, the feeder device comprising a stationary installation including a first metering device for metering a first quantity of material, wherein the feeder device includes at least one second metering device for arranging in stationary manner relative to the movable portion of the mold, said second metering device being connected to the first metering device in such a manner as to be fed with plastics material by said first metering device, and being shaped to be connected to the injection channel of the movable portion of the mold in such a manner as to feed it with plastics material.

12. A molding device according to claim 10, wherein the thermosetting material is selected from an advanced molding compound (AMC), a bulk molding compound (BMC), a sheet molding compound (SMC), or a composite material.

* * * * *